United States Patent
Salter et al.

(10) Patent No.: US 9,573,518 B1
(45) Date of Patent: Feb. 21, 2017

(54) FLOOR CONSOLE IR BIN LIGHT

(71) Applicant: Ford Global Technologies, LLC, Dearborn, MI (US)

(72) Inventors: Stuart C. Salter, White Lake, MI (US); Cornel Lewis Gardner, Romulus, MI (US); Pietro Buttolo, Dearborn Heights, MI (US); Jeffrey Singer, Plymouth, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/210,993

(22) Filed: Jul. 15, 2016

(51) Int. Cl.
| | | |
|---|---|---|
| *B60Q 1/00* | (2006.01) | |
| *B60Q 1/26* | (2006.01) | |
| *B60Q 3/02* | (2006.01) | |
| *F21V 9/16* | (2006.01) | |
| *F21V 23/04* | (2006.01) | |
| *B60R 7/04* | (2006.01) | |

(52) U.S. Cl.
CPC ............ *B60Q 3/022* (2013.01); *B60Q 3/0293* (2013.01); *B60R 7/04* (2013.01); *F21V 9/16* (2013.01); *F21V 23/0471* (2013.01); *F21Y 2115/10* (2016.08)

(58) Field of Classification Search
CPC ..... B60Q 3/022; B60Q 3/0253; B60Q 3/0293; B60R 7/04; B60R 7/043; F21V 9/16; F21V 23/0471
USPC ........................................................ 362/488
See application file for complete search history.

(56) References Cited

U.S. PATENT DOCUMENTS

| | | |
|---|---|---|
| 5,709,453 A | 1/1998 | Krent et al. |
| 6,031,511 A | 2/2000 | DeLuca et al. |
| 6,117,362 A | 9/2000 | Yen et al. |
| 6,494,490 B1 | 12/2002 | Trantoul |
| 6,577,073 B2 | 6/2003 | Shimizu et al. |
| 6,729,738 B2 | 5/2004 | Fuwausa et al. |
| 6,737,964 B2 | 5/2004 | Samman et al. |
| 6,773,129 B2 | 8/2004 | Anderson, Jr. et al. |
| 6,820,888 B1 | 11/2004 | Griffin |
| 6,851,840 B2 | 2/2005 | Ramamurthy et al. |
| 6,859,148 B2 | 2/2005 | Miller |
| 6,871,986 B2 | 3/2005 | Yamanaka et al. |
| 6,945,581 B2 | 9/2005 | Taylor |
| 6,953,536 B2 | 10/2005 | Yen et al. |
| 6,990,922 B2 | 1/2006 | Ichikawa et al. |
| 7,161,472 B2 | 1/2007 | Strumolo et al. |
| 7,213,923 B2 | 5/2007 | Liu et al. |
| 7,264,366 B2 | 9/2007 | Hulse |
| 7,264,367 B2 | 9/2007 | Hulse |
| 7,287,885 B2 | 10/2007 | Radu et al. |

(Continued)

FOREIGN PATENT DOCUMENTS

| | | |
|---|---|---|
| CN | 101337492 A | 1/2009 |
| CN | 201169230 Y | 2/2009 |

(Continued)

*Primary Examiner* — Jason Moon Han
(74) *Attorney, Agent, or Firm* — Vichit Chea; Price Heneveld LLP

(57) ABSTRACT

A lighting system of a vehicle is provided herein. A floor console bin is provided having a housing and a movable lid. A reflective target is coupled to the floor console bin. An overhead console is provided having an IR transmitter for emitting an IR signal toward a target location, an IR receiver for receiving and detecting the IR signal reflected by the target, and a projector for illuminating the housing based on detection of the IR signal.

20 Claims, 5 Drawing Sheets

(56) References Cited

U.S. PATENT DOCUMENTS

| | | |
|---|---|---|
| 7,422,352 B2 | 9/2008 | Sakakibara |
| 7,438,452 B2 | 10/2008 | Nawashiro |
| 7,441,914 B2 | 10/2008 | Palmer et al. |
| 7,501,749 B2 | 3/2009 | Takeda et al. |
| 7,575,349 B2 | 8/2009 | Bucher et al. |
| 7,745,818 B2 | 6/2010 | Sofue et al. |
| 7,753,541 B2 | 7/2010 | Chen et al. |
| 7,834,548 B2 | 11/2010 | Jousse et al. |
| 7,862,220 B2 | 1/2011 | Cannon et al. |
| 7,987,030 B2 | 7/2011 | Flores et al. |
| 8,016,465 B2 | 9/2011 | Egerer et al. |
| 8,022,818 B2 | 9/2011 | la Tendresse et al. |
| 8,071,988 B2 | 12/2011 | Lee et al. |
| 8,097,843 B2 | 1/2012 | Agrawal et al. |
| 8,136,425 B2 | 3/2012 | Bostick |
| 8,163,201 B2 | 4/2012 | Agrawal et al. |
| 8,178,852 B2 | 5/2012 | Kingsley et al. |
| 8,197,105 B2 | 6/2012 | Yang |
| 8,203,260 B2 | 6/2012 | Li et al. |
| 8,207,511 B2 | 6/2012 | Bortz et al. |
| 8,232,533 B2 | 7/2012 | Kingsley et al. |
| 8,247,761 B1 | 8/2012 | Agrawal et al. |
| 8,286,378 B2 | 10/2012 | Martin et al. |
| 8,408,766 B2 | 4/2013 | Wilson et al. |
| 8,415,642 B2 | 4/2013 | Kingsley et al. |
| 8,421,811 B2 | 4/2013 | Odland et al. |
| 8,466,438 B2 | 6/2013 | Lambert et al. |
| 8,519,359 B2 | 8/2013 | Kingsley et al. |
| 8,519,362 B2 | 8/2013 | Labrot et al. |
| 8,552,848 B2 | 10/2013 | Rao et al. |
| 8,606,430 B2 | 12/2013 | Seder et al. |
| 8,624,716 B2 | 1/2014 | Englander |
| 8,631,598 B2 | 1/2014 | Li et al. |
| 8,664,624 B2 | 3/2014 | Kingsley et al. |
| 8,683,722 B1 | 4/2014 | Cowan |
| 8,724,054 B2 | 5/2014 | Jones |
| 8,754,426 B2 | 6/2014 | Marx et al. |
| 8,773,012 B2 | 7/2014 | Ryu et al. |
| 8,846,184 B2 | 9/2014 | Agrawal et al. |
| 8,876,352 B2 | 11/2014 | Robbins et al. |
| 8,952,341 B2 | 2/2015 | Kingsley et al. |
| 9,006,751 B2 | 4/2015 | Kleo et al. |
| 9,057,021 B2 | 6/2015 | Kingsley et al. |
| 9,065,447 B2 | 6/2015 | Buttolo et al. |
| 9,187,034 B2 | 11/2015 | Tarahomi et al. |
| 9,299,887 B2 | 3/2016 | Lowenthal et al. |
| 2001/0053082 A1 | 12/2001 | Chipalkatti et al. |
| 2002/0159741 A1 | 10/2002 | Graves et al. |
| 2002/0163792 A1 | 11/2002 | Formoso |
| 2003/0002273 A1 | 1/2003 | Anderson, Jr. et al. |
| 2003/0179548 A1 | 9/2003 | Becker et al. |
| 2004/0213088 A1 | 10/2004 | Fuwausa |
| 2006/0087826 A1 | 4/2006 | Anderson, Jr. |
| 2006/0097121 A1 | 5/2006 | Fugate |
| 2007/0032319 A1 | 2/2007 | Tufte |
| 2007/0285938 A1 | 12/2007 | Palmer et al. |
| 2009/0219730 A1 | 9/2009 | Syfert et al. |
| 2009/0251920 A1 | 10/2009 | Kino et al. |
| 2009/0260562 A1 | 10/2009 | Folstad et al. |
| 2009/0262515 A1 | 10/2009 | Lee et al. |
| 2011/0012062 A1 | 1/2011 | Agrawal et al. |
| 2012/0001406 A1 | 1/2012 | Paxton et al. |
| 2012/0104954 A1 | 5/2012 | Huang |
| 2012/0183677 A1 | 7/2012 | Agrawal et al. |
| 2012/0230047 A1 | 9/2012 | Smith et al. |
| 2012/0280528 A1 | 11/2012 | Dellock et al. |
| 2013/0335994 A1 | 12/2013 | Mulder et al. |
| 2014/0065442 A1 | 3/2014 | Kingsley et al. |
| 2014/0103258 A1 | 4/2014 | Agrawal et al. |
| 2014/0264396 A1 | 9/2014 | Lowenthal et al. |
| 2014/0266666 A1 | 9/2014 | Habibi |
| 2014/0373898 A1 | 12/2014 | Rogers et al. |
| 2015/0046027 A1 | 2/2015 | Sura et al. |
| 2015/0138789 A1 | 5/2015 | Singer et al. |
| 2015/0267881 A1 | 9/2015 | Salter et al. |
| 2016/0016506 A1 | 1/2016 | Collins et al. |

FOREIGN PATENT DOCUMENTS

| | | |
|---|---|---|
| CN | 201193011 Y | 2/2009 |
| DE | 29708699 U1 | 7/1997 |
| DE | 10319396 A1 | 11/2004 |
| EP | 1793261 A1 | 6/2007 |
| EP | 2778209 A1 | 9/2014 |
| JP | 2000159011 A | 6/2000 |
| JP | 2007238063 A | 9/2007 |
| WO | 2006047306 A1 | 5/2006 |
| WO | 2014068440 A1 | 5/2014 |

# FLOOR CONSOLE IR BIN LIGHT

FIELD OF THE INVENTION

The present invention generally relates to lighting systems of a vehicle, and more particularly, to the illumination of a floor console bin.

BACKGROUND

Many modern vehicles are equipped with a floor console bin for storing items therein. However, such bins are often unilluminated, thus making it difficult for a user to see the contents of the bin. As such, there is a need for a lighting solution that addresses this shortcoming.

SUMMARY

According to one aspect of the present invention, a lighting system of a vehicle is provided. A floor console bin is provided having a housing and a lid movable between a closed and open position. A reflective target is coupled to the lid. An IR transmitter is aimed to emit an IR signal toward a target location. An IR receiver is positioned to receive and detect the IR signal reflected by the target. A projector illuminates the housing based on detection of the IR signal.

According to another aspect of the present invention, a lighting system of a vehicle is provided and includes a floor console bin having a housing. A reflective target is coupled to the housing. An IR transmitter is aimed to emit an IR signal toward the target. An IR receiver is positioned to receive and detect the IR signal reflected by the target. A projector illuminates the housing based on detection of the IR signal.

According to yet another aspect of the present invention, a lighting system of a vehicle is provided. A floor console bin is provided having a housing and a movable lid. A reflective target is coupled to the floor console bin. An overhead console is provided having an IR transmitter for emitting an IR signal toward a target location, an IR receiver for receiving and detecting the IR signal reflected by the target, and a projector for illuminating the housing based on detection of the IR signal.

These and other aspects, objects, and features of the present invention will be understood and appreciated by those skilled in the art upon studying the following specification, claims, and appended drawings.

DETAILED DESCRIPTION

As required, detailed embodiments of the present invention are disclosed herein. However, it is to be understood that the disclosed embodiments are merely exemplary of the invention that may be embodied in various and alternative forms. The figures are not necessarily to a detailed design and some schematics may be exaggerated or minimized to show function overview. Therefore, specific structural and functional details disclosed herein are not to be interpreted as limiting, but merely as a representative basis for teaching one skilled in the art to variously employ the present invention.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

Figure 1:
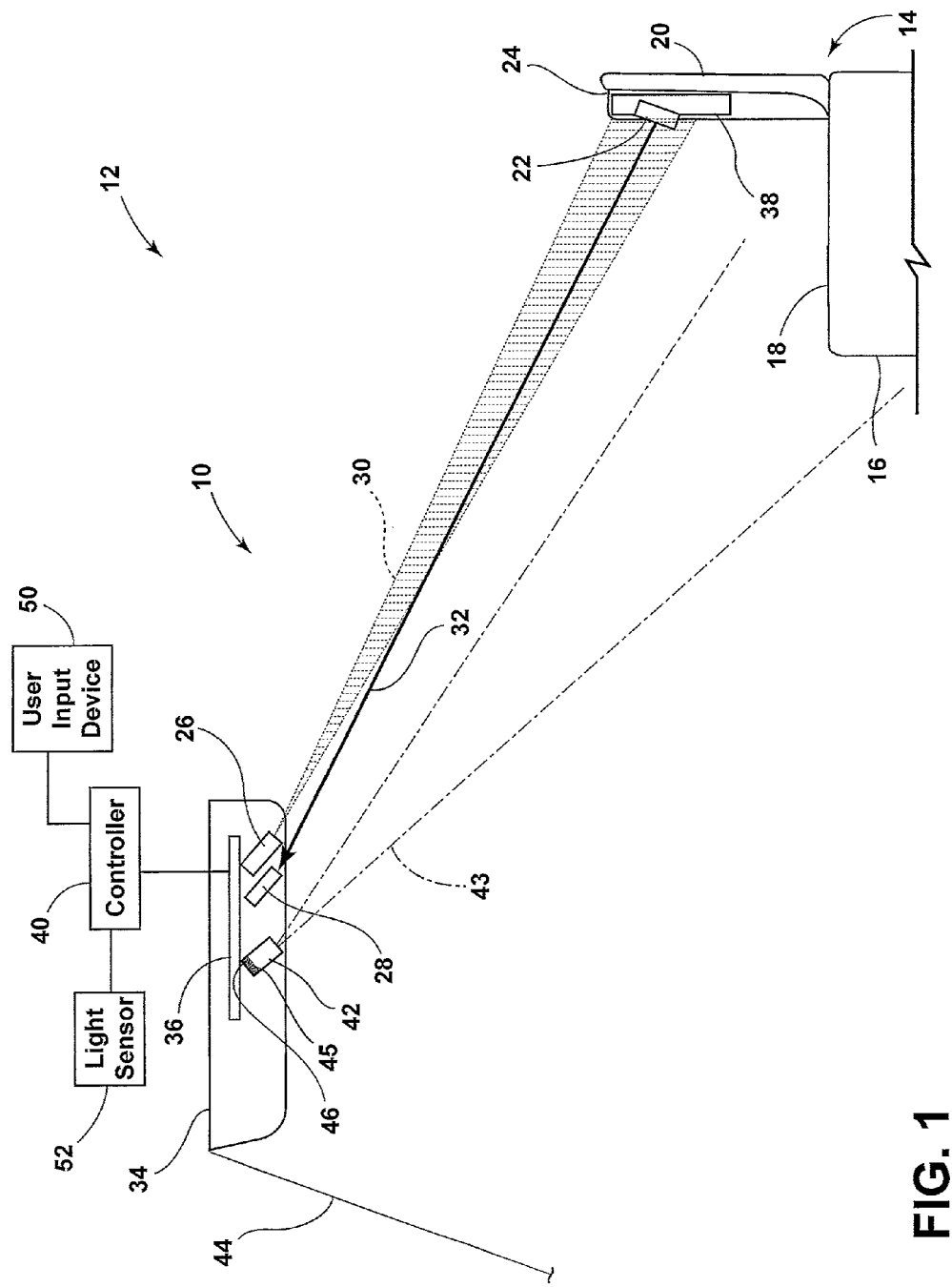
FIG. 1 is a schematic diagram illustrating a lighting system according to one embodiment.

Referring to FIG. 1, a lighting system 10 of a vehicle 12 is shown according to one embodiment. The lighting system 10 includes a floor console bin 14 generally located between a front driver seat and a front passenger seat. The floor console bin 14 includes a housing 16, the contents of which are accessible through a top 18 of the housing 16. The floor console bin 14 also includes a movable lid 20 pivotally coupled to a rear of the housing and configured to move between a closed position generally covering entry into the housing 16 and an open position to allow access into the housing 16. For purposes of illustration, FIG. 1 generally illustrates the lid 20 in an open position corresponding to a fully open position defined as the position at which the lid 20 can no longer be moved away from the housing 16. While the lid 20 is shown substantially upright relative to the housing 16, it is to be understood that the fully open position may be achieved at other positions forward or backward to that shown in FIG. 1. A reflective target 22 is coupled to the floor console bin 14. In the presently depicted embodiment, the reflective target 22 is coupled to the lid 20 at an underside location proximate a top end 24 of the lid 20. However, it is contemplated that the reflective target 22 may be located at other positions on the underside of the lid 20. The reflective target 22 may be embodied as a mirror or other device having reflective properties.

With continued reference to FIG. 1, the lighting system 10 includes an infrared (IR) transmitter 26 and an IR receiver 28. The IR transmitter 26 is aimed to emit an IR signal 30 toward a target location. In the presently depicted embodiment, the target location corresponds to a location of the target 22 when the lid 20 is moved to the open position, such as the fully opened position, thereby ensuring the IR signal 30 hits the target 22. The IR receiver 28 is positioned to receive and detect the IR signal 30 reflected by the target 22. For purposes of illustration, the reflected IR signal is generally represented by arrow 32. As shown in FIG. 1, both the IR transmitter 26 and receiver 28 are coupled to an overhead console 34 of the vehicle 12. The IR transmitter 26 and receiver 28 may be sunken into the overhead console 34 for concealment and may be electrically coupled to a printed circuit board (PCB) 36 therein. The PCB 36 may correspond to a dedicated PCB or an existing PCB, as is commonly found in the overhead console 34. Accordingly, the IR transmitter and receiver 26, 28 pair may be powered by a vehicle power supply or an alternative source, if so desired. In operation, the IR receiver 28 may detect (e.g., decode) the IR signal 30 through conventional means to assess signal strength, signal rise, signal range, signal stability, and any other signal characteristics that aid in uniquely identifying the IR signal 30.

Depending on the location of the IR transmitter and receiver 26, 28, the target 22 may be variously oriented relative the lid 20 to optimize IR signal reception. In the presently depicted embodiment, the target 22 is angled upward to substantially face the IR transmitter 26 and allow the reflected IR signal 30 to be transmitted to the IR receiver 28. Optionally, a dampening member 38 may be provided at the underside of the lid 20 to surround the target 22 to lessen stray reflections of the IR signal 30. The dampening member 38 may be embodied as black plastic or a black flocked cloth patch, for example.

In the presently depicted embodiment, the lighting system 10 may include a controller 40 communicatively coupled to the IR transmitter and receiver 26, 28 and configured to control the operation of the same. The controller 40 may be variously configured to include one or more programmable logic devices, application specific integrated circuits, digital signal processors, and/or microcontrollers for effectuating control of the IR transmitter and receiver 26, 28, along with other componentry of the lighting system 10, as will be described in greater detail below. It is to be understood that the controller 40 may be variously located inside the vehicle 12 and may be part of or otherwise communicatively coupled to one or more vehicle control systems and/or vehicle equipment.

With further reference to FIG. 1, the lighting system 10 includes a projector 42 for illuminating (e.g., illumination 43) the floor console bin 14, and more particularly, the housing 16 based on detection of the IR signal 30 by the IR receiver 28. The projector 42 may be coupled to the overhead console 34 to take advantage of existing electronics therein and may be sunken into the overhead console 34 for concealment. In the presently detected embodiment, the projector 42 is located closest to a front windshield 44 of the vehicle 12, followed in order by the IR receiver 28 and the IR transmitter 26. The projector 42 is shown substantially aimed toward the housing 16 but may take on other orientations such that the illumination 43 may also encompass the lid 20 or other structures surrounding the floor console bin 14.

In one specific scenario, the controller 40 activates the projector 42 in response to the IR receiver 28 detecting the IR signal 30, thereby causing the projector 42 to illuminate the housing 16. In one embodiment, the projector 42 includes a light source, shown as a light-emitting diode (LED) 45 for emitting a visible light (e.g., white light). In such a configuration, the illumination provided by the projector 42 directly illuminates the housing 16. In an alternative embodiment, LED 45 emits an excitation light (e.g., blue light or ultraviolet light (UV)) defining the illumination 43 provided by the projector 42 to the housing 16 and the housing 16 is configured to luminesce in a visible color (e.g., white light) in response to the excitation light. In yet another alternative embodiment, LED 45 may be configured to emit a visible light (e.g., white light) for directly illuminating the housing 16 and the projector 42 may further include an additional light source, shown as LED 46, for supplying excitation light (e.g., blue light or UV light) toward the housing 16 and causing the same to luminesce in response to the excitation light. In this embodiment, the color of the luminescent light emitted from the housing 16 may be perceptively distinguishable from the color of the illumination provided by LED 45.

Figure 2:
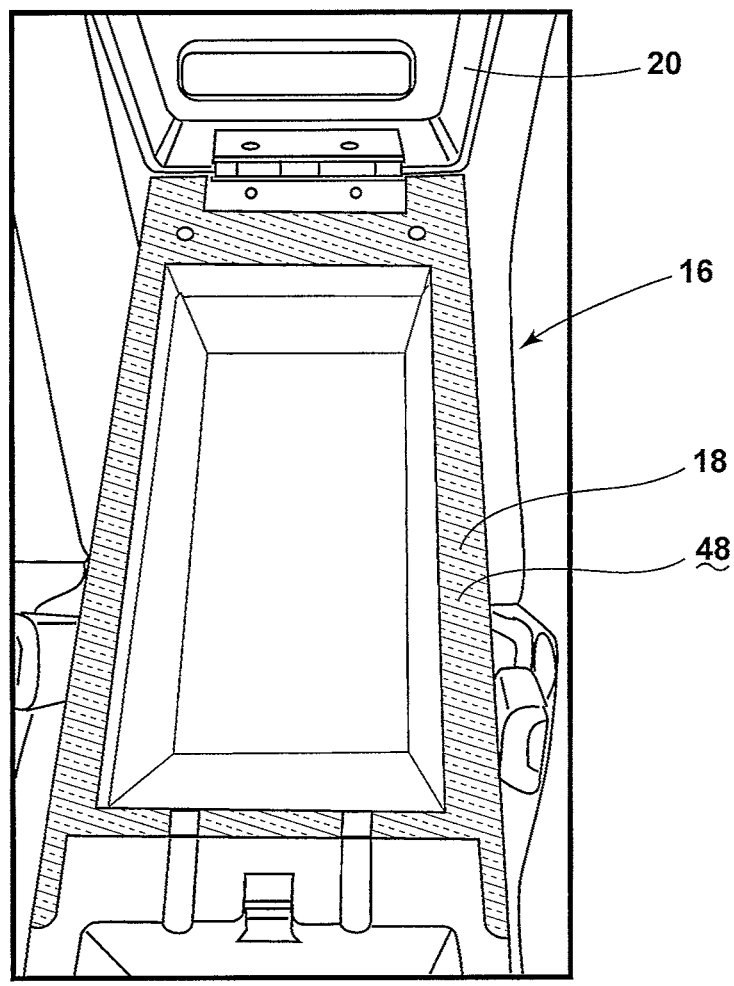
FIG. 2 illustrates a housing of a floor console bin, the housing being configured to luminesce in response to excitation light.

Referring to FIG. 2, a photoluminescent structure 48 is coupled to the top 18 of the housing 16 and may include one or more photoluminescent materials configured to luminesce in response to the excitation light. The photoluminescent structure 48 may be applied to the top 18 of the housing 16 through pad printing, painting, flexography, or other known processes. Alternatively the photoluminescent structure 48 may be integrated with the housing 16 through a molding process. While the photoluminescent structure 48 is shown coupled to the top 18 of the housing 16, it should be appreciated that additional photoluminescent structures may be coupled to other portions of the housing 16 such as a side wall and internal lining, if desired. Photoluminescent structures may also be coupled to the underside of the lid 20 in embodiments where the illumination 43 encompasses the same.

According to one embodiment, the photoluminescent materials may include long-persistence phosphors, which are defined herein as being able to store excitation light and release light gradually, for a period of several minutes or hours, once the excitation light ceases to be provided. The decay time may be defined as the time between the end of excitation and the moment when the light intensity of the photoluminescent materials drop below a minimum visibility of 0.32 mcd/m$^2$. A visibility of 0.32 mcd/m$^2$ is roughly 100 times the sensitivity of the dark-adapted human eye, which corresponds to a base level of illumination commonly used by persons of ordinary skill in the art. Accordingly, the photoluminescent materials may be configured to luminesce at or above an intensity of 0.32 mcd/m$^2$ after being exposed to the excitation light for a period of 10-30 minutes and may continue to luminesce at or above an intensity of 0.32 mcd/m$^2$ for a sustained period of time (e.g., the period may extend 8 hours or longer) after the excitation light ceases to be provided.

The long-persistence phosphors may correspond to alkaline earth aluminates and silicates, for example doped disilicates, or any other compound that is capable of emitting light for a period of time once excitation light is no longer available. The long-persistence phosphors may be doped with one or more ions, which may correspond to rare earth elements, for example, $Eu^{2+}$, $Tb^{3+}$ and/or $Dy^3$. It will be understood that the compositions provided herein are non-limiting examples and any long-persistence phosphors known in the art may be utilized without departing from the teachings provided herein.

Additional information regarding the production of long-persistence photoluminescent structures is disclosed in U.S. Pat. No. 8,163,201 to Agrawal et al., entitled "HIGH-INTENSITY, PERSISTENT PHOTOLUMINESCENT FORMULATIONS AND OBJECTS, AND METHODS FOR CREATING THE SAME," issued Apr. 24, 2012; U.S. Pat. No. 6,953,536 to Yen et al., entitled "LONG PERSISTENT PHOSPHORS AND PERSISTENT ENERGY TRANSFER TECHNIQUE," issued Oct. 11, 2005; U.S. Pat. No. 6,117,362 to Yen et al., entitled "LONG-PERSISTENCE BLUE PHOSPHORS," issued Sep. 12, 2000; and U.S. Pat. No. 8,952,341 to Kingsley et al., entitled "LOW RARE EARTH MINERAL PHOTOLUMINESCENT COMPOSITIONS AND STRUCTURES FOR GENERATING LONG-PERSISTENCE LUMINESCENCE," issued Feb. 10, 2015, all of which are incorporated herein by reference in their entirety.

Moreover, it is contemplated that other photoluminescent materials, which do not necessarily exhibit long-persistence qualities, may also be utilized without departing from the teachings provided herein. Such photoluminescent materials may have energy converting elements with phosphorescent or fluorescent properties. For example, the photoluminescent material may include organic or inorganic fluorescent dyes including rylenes, xanthenes, porphyrins, and phthalocyanines, or combinations thereof. Additionally or alternatively, the photoluminescent material may include phosphors from the group of Ce-doped garnets such as YAG:Ce. The photoluminescent material may be formulated to have a Stokes shift resulting in the conversion of visible or non-visible light into visible light having an emission spectrum expressed in a desired color, which may vary. Such photoluminescent material may have a limited persistence (e.g., less than about 10 minutes, less than about 5 minutes, less than about 1 minute or no human perceivable persistence).

Referring back to FIG. 1, the controller 40 may control the operation of the projector 42 based on input received from a user-input device 50 and/or a light sensor 52 of the vehicle 12. For example, a user desiring to deactivate the projector 42 may input a corresponding command using the user-input device 50, which may be variously embodied as a touchscreen, button, switch, or other known device. In scenarios where the projector 42 is activated, the controller 40 may control an intensity of the illumination 43 supplied from the projector 42 based on information received from the light sensor 52. In this manner, the intensity of the illumination 43 may be increased in dark environments (e.g., nighttime) and decreased or otherwise suppressed in brighter environments (e.g., daytime). In embodiments where the illumination 43, or portion thereof, includes excitation light, increasing or decreasing the intensity of the illumination 43 may also serve to control the level of luminescence exhibited by the housing 16 or other structures having a photoluminescent structure coupled thereto and receiving excitation light from the projector 42.

Figure 3:
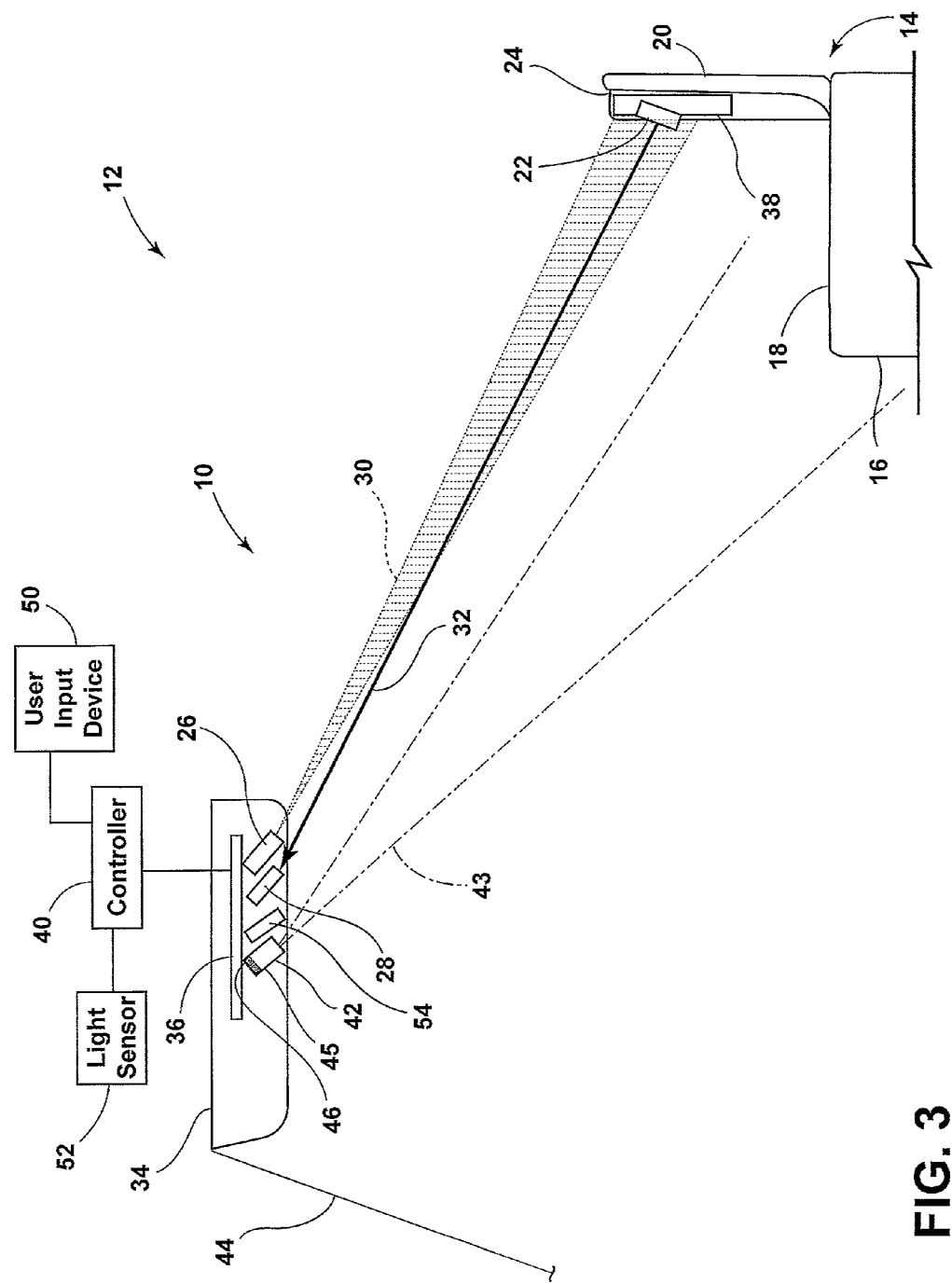
FIG. 3 is a schematic diagram illustrating the lighting system according to an alternative embodiment.

Referring to FIG. 3, the lighting system 10 is shown to optionally include an additional IR receiver 54 sunken into the overhead console 34 and electrically coupled to the PCB 36. The additional IR receiver 54 may be positioned between the projector 42 and IR receiver 28 and may be aimed toward the target location or a location there below such as toward the top 18 of the housing 16. In operation, the additional IR receiver 54 may be configured to detect stray reflections of the IR signal 30. The additional IR receiver 54 may be communicatively coupled to the controller 40 such that the projector 42 may be prevented from illuminating based on the additional IR receiver 54 detecting the IR signal 30. Thus, the additional IR receiver 54 may serve as a countermeasure against inadvertent actuation of the projection 42.

Figure 4:
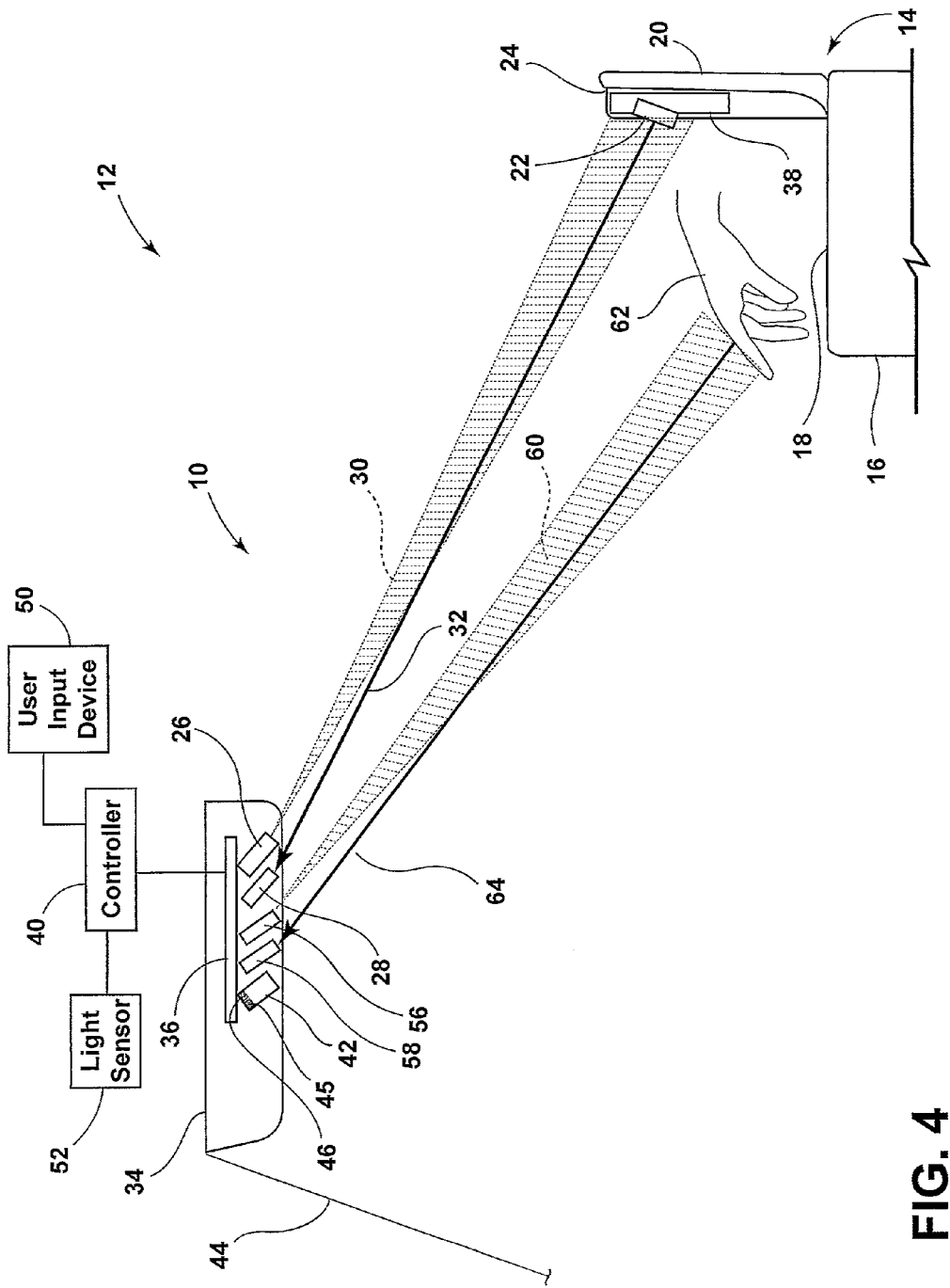
FIG. 4 is a schematic diagram illustrating the lighting system according to yet another alternative embodiment.

Referring to FIG. 4, the lighting system 10 is shown to optionally include an additional IR transmitter 56 and receiver 58 sunken into the overhead console 34 and electrically coupled to the PCB 36. The additional IR transmitter 56 and receiver 58 may be positioned the projector 42 and IR receiver 28. In the presently depicted embodiment, the additional IR transmitter and receiver 56, 58 collectively operate to detect user based interaction with the floor console bin 14. As shown, the additional IR transmitter 56 may be aimed to transmit a corresponding IR signal 60 toward the top 18 of the housing 16. The additional IR receiver 58 is positioned to receive the IR signal 60 reflected by a movable object, shown as hand 62, in close proximity to the housing 16. For purposes of illustration the reflected IR signal 60 received by the additional IR receiver 58 is represented by arrow 64. The additional IR transmitter 56 and receiver 58 may be communicatively coupled with the controller 40 such that the controller 40 may operate the projector 42 based on IR receiver 28 detecting the IR signal 30 reflected by the target 22 and the additional IR receiver 58 detecting the IR signal 60 reflected by hand 62. In one embodiment, the controller 40 may activate the projector 42 upon IR receiver 28 detecting reflected IR signal 30 and the additional IR receiver 58 detecting reflected IR signal 60. Assuming IR receiver 28 continues to detect the reflected IR signal 30, the projector 42 may remain activated so long as the additional IR receiver 58 detects reflected signal 60. In instances where the additional IR receiver 58 no longer detects reflected signal 60 while reflected IR signal 30 remains detected by IR receiver 28, the controller 40 may deactivate the projector 42 after a predetermined period of time or instantly. In this manner, the operation of the projector 42 is predicated on the target 22 being located at the target location and detection of a movable object in close proximity to the floor console bin 14.

Figure 5:
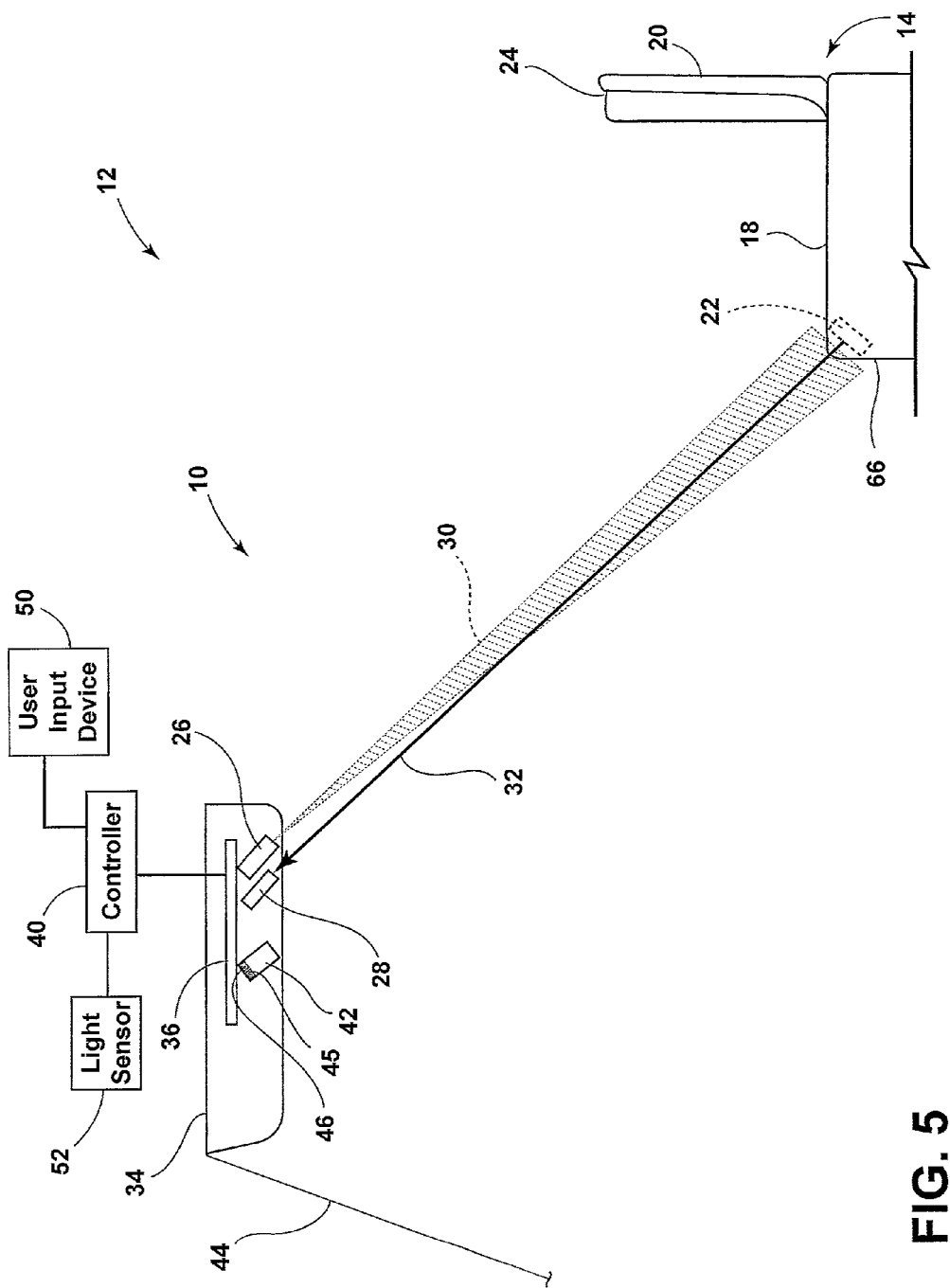
FIG. 5 is a schematic diagram illustrating an alternative placement of a reflective target.

Referring to FIG. 5, the target 22 is shown alternatively coupled to the housing 16 and located toward a front end 66 of the housing 16. The target 22 may be angled upward to facilitate the reception of the IR signal 30 from IR transmitter 26 and IR receiver 38 may be oriented to receive the reflected signal 30 from the target 22. By virtue of the target 22 location, the target 22 is generally exposed to the IR signal 30 when the lid 20 is moved to the open position. With the exception of the location of the target 22, the lighting system 10 shown in FIG. 5 may be configured according to any of the embodiments described herein.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A lighting system of a vehicle, comprising:
   a floor console bin within the vehicle having a housing and a lid movable between a closed and open position;
   a reflective target coupled to the lid;
   an IR transmitter aimed to emit an IR signal toward a target location;
   an IR receiver positioned to receive and detect the IR signal reflected by the target; and
   a projector for illuminating the housing based on detection of the IR signal.

2. The lighting system of claim 1, wherein the target is provided beneath the lid and the target location corresponds to a location of the target when the lid is in the open position.

3. The lighting system of claim 1, further comprising an additional IR receiver positioned to receive and detect stray reflections of the IR signal, and wherein the projector is prevented from illuminating based on the additional IR receiver detecting the IR signal.

4. The lighting system of claim 1, wherein the IR transmitter and receiver are coupled to an overhead console of the vehicle.

5. The lighting system of claim 1, further comprising a controller communicatively coupled to the IR receiver and configured to activate the projector in response to the IR receiver detecting the IR signal.

6. The lighting system of claim 1, wherein the illumination provided by the projector to the housing comprises excitation light and the housing is configured to luminesce in response to the excitation light.

7. The lighting system of claim 1, further comprising an additional IR transmitter and receiver operating in conjunction to detect the presence of a movable object in close proximity to the floor console bin, wherein the projector is operated based on the detection of the movable object.

8. A lighting system of a vehicle, comprising:
   a floor console bin within the vehicle having a housing;

a reflective target coupled to the housing;
an IR transmitter aimed to emit an IR signal toward the target;
an IR receiver positioned to receive and detect the IR signal reflected by the target; and
a projector for illuminating the housing based on detection of the IR signal.

9. The lighting system of claim 8, further comprising a lid coupled to the housing and movable between a closed and open position, and wherein the target is exposed to the IR signal when the lid is in the open position.

10. The lighting system of claim 8, further comprising an additional IR receiver positioned to receive and detect stray reflections of the IR signal, and wherein the projector is prevented from illuminating based on the additional IR receiver detecting the IR signal.

11. The lighting system of claim 8, wherein the IR transmitter and receiver are coupled to an overhead console of the vehicle.

12. The lighting system of claim 8, further comprising a controller communicatively coupled to the IR receiver and configured to activate the projector in response to the IR receiver detecting the IR signal.

13. The lighting system of claim 8, wherein the illumination provided by the projector to the housing comprises an excitation light and the housing is configured to luminesce in response to the excitation light.

14. The lighting system of claim 8, further comprising an additional IR transmitter and receiver operating in conjunction to detect the presence of a movable object in close proximity to the floor console bin, wherein the projector is operated based on the detection of the movable object.

15. A lighting system of a vehicle, comprising:
a floor console bin within the vehicle having a housing and a movable lid;
a reflective target coupled to the floor console bin; and
an overhead console comprising:
an IR transmitter for emitting an IR signal toward a target location;
an IR receiver for receiving and detecting the IR signal reflected by the target; and
a projector for illuminating the housing based on detection of the IR signal.

16. The lighting system of claim 15, wherein the target is provided beneath the lid and the target location corresponds to a location of the target when the lid is moved to an open position.

17. The lighting system of claim 15, wherein the target is coupled to the housing and is exposed to the IR signal when the lid is moved to an open position.

18. The lighting system of claim 15, wherein the IR transmitter, the IR receiver, and the projector are sunken into the overhead console.

19. The lighting system of claim 15, further comprising an additional IR receiver positioned to receive and detect stray reflections of the IR signal, and wherein the projector is prevented from illuminating based on the additional IR receiver detecting the IR signal.

20. The lighting system of claim 15, further comprising an additional IR transmitter and receiver operating in conjunction to detect the presence of a movable object in close proximity to the floor console bin, wherein the projector is operated based on the detection of the movable object.

* * * * *